United States Patent [19]

Adams, Jr. et al.

[11] Patent Number: 4,806,331

[45] Date of Patent: Feb. 21, 1989

[54] PROCESS OF SINTERING ALKALINE EARTH METAL CARBONATES

[75] Inventors: Charles Adams, Jr.; Jerry A. Cook, both of Cartersville, Ga.

[73] Assignee: Chemical Products Corporation, Cartersville, Ga.

[21] Appl. No.: 8,657

[22] Filed: Jan. 30, 1987

[51] Int. Cl.$^4$ ............................................. C01F 11/18
[52] U.S. Cl. ........................... 423/430; 423/636; 501/133; 106/463; 23/293 R
[58] Field of Search .............. 423/430, 637, 636, 635; 501/94, 133, 144; 106/306; 23/293 R

[56] References Cited

U.S. PATENT DOCUMENTS

| | | | |
|---|---|---|---|
| 3,060,043 | 10/1962 | Renkey | 106/64 |
| 3,314,758 | 4/1967 | Scott et al. | 23/182 |
| 3,743,691 | 7/1973 | Tren | 423/165 |
| 3,875,298 | 4/1975 | Coatiney et al. | 423/637 |
| 3,883,364 | 5/1975 | Robertson et al. | 106/306 |
| 3,898,091 | 8/1975 | Stout | 501/20 |
| 4,297,309 | 10/1981 | North | 264/148 |
| 4,387,195 | 6/1983 | Tully et al. | 501/144 |
| 4,415,364 | 11/1983 | Naito et al. | 106/84 |
| 4,421,729 | 12/1983 | Chiang et al. | 423/430 |
| 4,452,635 | 6/1984 | Noshi et al. | 106/74 |
| 4,506,025 | 3/1985 | Kleeb et al. | 501/133 |

*Primary Examiner*—Anthony MacFarlane
*Attorney, Agent, or Firm*—Sutherland, Asbill & Brennan

[57] ABSTRACT

A strontium or barium carbonate product that is better suited for use as a glass ingredient is obtained by sintering the powdered carbonate in a kiln lined with fused amorphous silica. The carbonate picks up fewer harmful contaminants from the amorphous silica lining than it does from, say, a refractory silica-alumina brick lining or a kiln having a metallic inner surface.

15 Claims, No Drawings

PROCESS OF SINTERING ALKALINE EARTH METAL CARBONATES

This invention concerns an improved method of sintering fine particle size strontium or barium carbonate into larger granules, which are especially suitable as a source of strontium or barium component in the glass for television face plates.

Strontium carbonate is a white, crystalline solid having a rhombic structure below 926° C. It is essentially insoluble in water. Barium carbonate also is an insoluble, white, crystalline solid.

In the current commercial production of strontium carbonate or barium carbonate, naturally occurring strontium sulfate (celestite ore) or barium sulfate (barite ore) is reduced to strontium sulfide or barium sulfide, both of which are water-soluble. The sulfide is dissolved in water, then the solution is filtered to remove insoluble impurities. Substantially pure carbonate crystals of about 1 micron particle size are precipitated from the solution by the introduction of either sodium carbonate or carbon dioxide gas. These very small crystals, when washed, filtered, and dried, yield fluffy, low bulk density powders.

The largest use of strontium carbonate is in the manufacture of glass face plates for color television sets. This is the pane of glass separating the viewer from the cathode ray tube. Strontium carbonate is present in the glass at about 12 to 14 weight percent (calculated as strontium oxide) and functions as an x-ray absorber. Strontium carbonate is an effective x-ray barrier because strontium has a large atomic radius; its presence is required in the face plates for the relatively high voltage television sets used in the U.S. and Japan. A lesser amount of barium carbonate usually is incorporated in these face plates as well. The face plates of black-and-white televisions and the lower voltage Western European color televisions contain barium carbonate as the primary x-ray absorber.

The quality of face plates for television sets is critical. If the slightest imperfection in the face plate, such as a tiny undissolved "stone" or a "cold glass defect", caused by incomplete mixing of the glass batch ingredients, is detected, the face plate must be broken and remelted in the furnace. This recycling of flawed face plates is expensive in terms of energy use and reduction of plant capacity.

The fluffy, low bulk density powders normally obtained by drying precipitated strontium carbonate and barium carbonate are not suitable as feedstocks for glass furnaces. The powders are not free-flowing and cannot be discharged from bulk storage bins. Also, their low bulk density greatly reduces the amount of strontium carbonate or barium carbonate that can be stored in a given volume. The fineness of the powders makes it impossible to accurately control the chemical composition of a glass batch to which they are added, because a substantial amount of strontium or barium will escape from the furnace as dust. Airborne barium carbonate poses a health hazard as well, since it is poisonous.

While some briquetting of strontium carbonate or barium carbonate powder under high pressure has been employed, the strontium carbonate and barium carbonate products suited for feedstock for glass manufacture have been produced almost exclusively by heating the dried filter cake to at least about 800° C. in a refractory-lined kiln to sinter the individual crystals, allowing them to adhere to one another to form larger particles. This yields dense, hard granules, which then are ground to the desired final product particle size, which generally is 100% passing through a 14 mesh screen (Tyler). To reduce the dustiness of these ground products, they usually are also screened to remove fines passing through a 150 mesh screen. The loose bulk density of the sintered carbonate, prior to grinding, usually is at least about 90 pounds per cubic foot.

Some contamination of the product occurs as a result of this high-temperature sintering. If the sintering is carried out in a refractory brick-lined kiln, which is the usual practice, a small amount of the refractory material will inevitably contaminate the strontium carbonate or barium carbonate product. If the sintering is carried out in an unlined, metallic piece of equipment, metallic contamination of the product will result. Both forms of contamination are troublesome. Refractory contaminants are difficult to melt or dissolve in a glass furnace charge, causing defects in the glass. Metallic contamination causes undesirable coloration of the glass. Also, the high temperatures required for sintering are hard on metallic equipment, requiring it to be repaired or replaced frequently.

We have discovered that if the kiln in which the strontium or barium carbonate is sintered is lined with fused amorphous silica, the resulting product will have substantially fewer contaminants that are incompatible with glass. As a result, when the carbonate is used in the glass-making process, fewer defective pieces, e.g. television face plates, will be produced. So far as we are aware, the prior art sintering of alkaline earth metal carbonates has always been conducted in kilns lined with silica-alumina refractory material. At one time silica-alumina bricks which contained mullite, a crystalline aluminosilicate, were used. Today the bricks used are largely free of mullite, but do contain aluminum oxide.

Barium and strontium carbonate are known to react with silica at high temperatures to form barium and strontium silicates. (See Vesher et. al., "Physicochemical Processes in the Preparation of Strontium Silicates," SNVNAR, Vol. 29, 21-25 (1985) (Russian), and Kirk-Othmer Encyclopedia of Chemical Technology, Third Edition John Wiley and Sons, Volume 3, page 473.) One might expect, therefore, that a silica lining would be undesirable for the kiln because it would be rapidly eroded during the sintering process. We have found, however, that a smooth, glassy coating, evidently of barium silicate or strontium silicate, forms on the surface only of the lining, that this coating is quite durable, and that erosion or disintegration of the lining is not a problem. Also, any silicate scale that does get mixed in with the carbonate is far more compatible with the glass than are the refractory brick contaminants of the prior art.

Crystalline silica is not suitable for use as the kiln lining because it spalls when subjected to the high temperatures required for sintering the alkaline earth metal carbonates. This quickly destroys the lining. Also, the flakes and chips of crystalline silica caused by this spalling mix with the carbonate and degrade it. Amorphous fused silica has a very low coefficient of thermal expansion; therefore, it spalls much less than the crystalline variety. Also, if crystalline silica particles become airborne, they are more hazardous than amorphous silica particles. The long term inhalation of significant amounts of crystalline silica is known to cause a lung disease called silicosis, which is a form of pneumoconeosis. Amorphous silica particles are believed to pose less of a health risk.

Amorphous fused silica can be formed by melting sand and cooling the melt to obtain a glass. The glass is ground and screened into three fractions: minus 4 mesh, plus 10 mesh; minus 10 mesh, plus 100 mesh; and minus 100 mesh (all Tyler). The three fractions are mixed in controlled proportions; a binder is added to give the unfired bricks strength, and the mixture is pressed into a brick mold. After firing at temperatures in the range of about 980° to 1040° C., the silica bricks are suitable for use as the kiln lining.

A convenient size of silica brick is a face surface area of about 100 to 200 square centimeters and a thickness of about 5 to 20 centimeters. Preferably the bricks are held in place in the kiln with little or no mortar, so as to minimize contamination of the carbonate product. The preferred kiln to use is a hollow cylindrical kiln, which rotates about its axis. The kiln is mounted with its axis nearly horizontal. The bricks used to line the steel wall of such a kiln are congruently curved and have a cross-section shape like an arched trapezoid. In this manner all the bricks can be held in place without the use of mortar, since each brick functions like the keystone in a masonry arch. Usually it is desirable, however, to set one or two of the bricks in each course or row in mortar, to insure a snug fit.

The powdered barium or strontium carbonate subjected to sintering in the process of the present invention normally will have a loose bulk density in the range of about 30 to 45 pounds per cubic foot. (This is after being dried at 110° C. and lightly pulverized with a mortar and pestle.) The sintering kiln is preferably operated at a temperature in the range of about 850° to 1050° C. for strontium carbonate and in the range of about 800° to 950° C. for barium carbonate. The carbonate preferably is held in the kiln until it forms large enough lumps or granules that at least about 99 weight percent of the carbonate is held on a 150 mesh screen (Tyler). The sintered carbonate preferably is allowed to cool before being ground, e.g., to a temperature below about 100° C.

The invention is further illustrated by the following examples:

EXAMPLE I (Preparation of Sintered Strontium Carbonate)

Naturally occurring strontium sulfate ore is reduced to water-soluble strontium sulfide, the strontium sulfide is dissolved in water, the solution is filtered to remove insoluble impurities, and pure carbon dioxide gas is bubbled through the solution to precipitate 0.7 to 1.0 micron-sized strontium carbonate crystals. The strontium carbonate crystals are washed and filtered to yield a crumbly, semi-solid filter cake containing about 67% $SrCO_3$ by weight (about 35% $SrCO_3$ by volume, based on the specific gravity of $SrCO_3$). If this filter cake is dried it yields a very soft, fluffy solid that has a loose bulk density of about 37 pounds per cubic foot after being lightly pulverized with a mortar and pestle.

The above filter cake is introduced into an amorphous, fused silica brick-lined rotary kiln with a screw conveyor at the end opposite the "hot end". The combustion gases from a gas burner in the "hot end" of the rotary kiln travel the length of the kiln, dry and heat the strontium carbonate in the "cold end" of the kiln, and are then exhausted.

The amorphous, fused silica brick lining consists of silica brick which are all about 23 cm. in length, about 11 cm. in thickness (giving an insulating layer 11 cm. thick on the inside of the rotary kiln's steel tubular shell) and a width which decreases from 7.6 cm. next to the kiln's steel shell to only 6.4 or 7.0 cm. on the face which is in contact with the strontium carbonate. This shape of the bricks allows them to be laid in the kiln's shell without mortar to form a circle which is self-supporting.

The rotary kiln is slightly inclined so that the strontium carbonate tumbles from the "cold end" to the "hot end" of the kiln as the kiln is rotated. The degree of incline is about one foot in height per each 30 feet in kiln length. The strontium carbonate spends from 10 to 20 minutes at a temperature of about 850° to 1050° C. (depending on the feed rate to the kiln) before it falls out of the hot end into a rotary cooling device. The rotary cooler tumbles the strontium carbonate while water pours over the outside of the cooler's steel shell.

Prior to grinding, the sintered strontium carbonate takes the form of white lumps averaging 1.5 cm. in diameter, with only about 10% being below 14 mesh in size. These lumps are ground in a cage mill to the desired product size of minus 14 mesh and larger than 150 mesh.

EXAMPLE II (Preparation of Sintered Barium Carbonate)

Naturally occurring barium sulfate ore is reduced to water-soluble barium sulfide, the barium sulfide is dissolved in water, the solution is filtered to remove insoluble impurities, and pure carbon dioxide gas is bubbled through the solution to precipitate 0.8 to 0.9 micron-sized barium carbonate crystals. The barium carbonate crystals are washed and filtered to yield a crumbly, semi-solid filter cake containing about 73% $BaCO_3$, by weight (about 38% $BaCO_3$ by volume, based on the specific gravity of $BaCO_3$). If this filter cake is dried it yields a soft, fluffy solid that has a loose bulk density of about 44 pounds per cubic foot when pulverized in a Raymond Impact Mill.

The above filter cake is introduced into the amorphous, fused silica brick-lined rotary kiln described in Example I preceding. The barium carbonate spends from 10 to 20 minutes at a temperature of about 850° to 950° C. (depending on the feed rate to the kiln) before it falls out into the rotary cooling device.

Prior to grinding, the sintered barium carbonate takes the form of white lumps averaging 1.5 cm. in diameter, with only about 10% being below 14 mesh in size. These lumps are ground in a cage mill to the desired product size of smaller than 14 mesh and larger than 150 mesh.

EXAMPLE III (Manufacture of Glass Face Plates for Color TV Sets)

The following ingredients are intimately blended in the stated amounts to form a batch of glass furnace feed:

| Ingredient | Weight (kg) |
| --- | --- |
| Sand | 295 |
| Dolomitic limestone | 15.4 |
| Feldspar | 47 |
| Soda ash | 54 |
| Potassium carbonate | 61 |

-continued

| Ingredient | Weight (kg) |
| --- | --- |
| Strontium carbonate | 74 |
| Barium carbonate | 12 |
| Litharge | 9 |
| Ceric hydroxide | 0.8 |
| Aqueous arsenic acid solution (15 wt. % concentration) | 6 |
| Antimony oxide | 1.1 |
| Titanium dioxide | 0.7 |
| Cullet (crushed glass) | 430 |

The blended batch of glass furnace feed is continuously introduced into the furnace at the controlled rate of 1/22 of the furnace's glass-holding capacity per hour. The melting zone of the furnace is held at 1350° C., the fining zone at 1450° C., and the conditioning zone at 1200° C. The molten glass flows out of the furnace and is formed at about 1000° C., in stainless steel molds, into the shape of face plates for 25-inch color television The face plates are inspected for defects. Tiny "cold glass" defects, which show up as bright spots in the glass when it is illuminated, cause a face plate to be rejected and crushed up to be reintroduced to the glass furnace as cullet. When the strontium carbonate and barium carbonate ingredients are sintered products made in a kiln lined with standard refractory brick (comprised of about 50 to 55 wt. % silica and 40 to 45 wt. % alumina), approximately 10% of the face plates must be rejected because of "stones" and "cold glass defects". But when the strontium carbonate and barium carbonate ingredients are the products, respectively, of Examples I and II herein, the face plates that have to be rejected are only about 8% of all those molded. This is a significant decrease, representing a substantial cost savings.

EXAMPLE IV (Manufacture of Glass Face Plates for Black-and-White TV Sets)

The following ingredients are intimately blended in the stated amounts to form a batch of glass furnace feed:

| Ingredient | Weight (kg) |
| --- | --- |
| Sand | 280 |
| Feldspar | 94 |
| Lithium carbonate | 6 |
| Soda ash | 61 |
| Potassium carbonate | 59 |
| Lead carbonate | 12 |
| Barium carbonate | 81 |
| Antimony oxide | 1.1 |
| Aqueous arsenic acid solution (15 wt. % concentration) | 6 |
| Cobalt oxide | 0.4 |
| Nickel oxide | 0.5 |
| Cullet | 415 |

The blended batch of glass furnace feed is continuously introduced into the furnace at the controlled rate of 1/25 of the furnace's glass-holding capacity per hour. The melting zone of the furnace is held at 1300° C., the fining zone at 1400° C., and the conditioning zone at 1200° C. The molten glass flows out of the furnace and is formed at about 1000° C., in stainless steel molds, into the shape of television face plates for 19-inch black-and-white television sets.

The face plates are inspected for defects. When the barium carbonate ingredient is a sintered product made in a kiln lined with silica-alumina refractory brick, approximately 12% of the face plates must be rejected because of "stones" and "cold glass defects". When the barium carbonate ingredient is the product of Example II herein, only about 10% of the face plates have to be rejected.

We claim:

1. In a process of converting powdered barium or strontium carbonate into larger granules of barium or strontium carbonate by heating the carbonate to its sintering temperature in a refractory-lined kiln, the improvement wherein the refractory is fused amorphous silica.

2. The process of claim 1, wherein the carbonate is barium carbonate.

3. The process of claim 1, wherein the carbonate is strontium carbonate.

4. The process of claim 2 wherein the powdered barium carbonate has a loose bulk density in the range of about 30 to 45 pounds per cubic foot and the larger granules have a loose bulk density of at least about 90 pounds per cubic foot.

5. The process of claim 3 wherein the powdered strontium carbonate has a loose bulk density in the range of about 30 to 45 pounds per cubic foot and the larger granules have a bulk density of at least about 90 pounds per cubic foot.

6. The process of claim 4, wherein the barium carbonate is held in the kiln long enough for it to form lumps or granules of which at least about 99 weight percent (unground) is held on a 150 mesh screen (Tyler).

7. The process of claim 5, wherein the strontium carbonate is held in the kiln long enough for it to form lumps or granules of which at least about 99 weight percent (unground) is held on a 150 mesh screen (Tyler).

8. The process of claim 6, wherein the kiln is a rotary kiln operated at a temperature in the range of about 800° to 950° C.

9. The process of claim 7, wherein the kiln is a rotary kiln operated at a temperature in the range of about 850° to 1050° C.

10. The process of claim 8, wherein the silica lining has a thickness in the range of about 5 to 20 centimeters.

11. The process of claim 9, wherein the silica lining has a thickness in the range of about 5 to 20 centimeters.

12. The process of claim 10, wherein the lining is in the form of fused amorphous silica bricks primarily held in place without mortar.

13. The process of claim 11, wherein the lining is in the form of fused amorphous silica bricks primarily held in place without mortar.

14. The process of claim 12, wherein the face of each brick has a surface area of about 100 to 200 square centimeters.

15. The process of claim 13, wherein the face of each brick has a surface area of about 100 to 200 square centimeters.

* * * * *